(12) United States Patent
Chu et al.

(10) Patent No.: US 7,510,802 B2
(45) Date of Patent: Mar. 31, 2009

(54) MULTILAYER FERRITIN ARRAY FOR BIONANOBATTERY

(75) Inventors: Sang-Hyon Chu, Newport News, VA (US); Sang H. Choi, Poquoson, VA (US); Jae-Woo Kim, Newport News, VA (US); Peter T. Lillehei, Yorktown, VA (US); Yeonjoon Park, Yorktown, VA (US); Glen C. King, Yorktown, VA (US); James R. Elliott, Jr., Yorktown, VA (US)

(73) Assignees: National Institute of Aerospace Associates, Hampton, VA (US); The United States of America as represented by the Administration of NASA, Washington, DC (US)

( * ) Notice: Subject to any disclaimer, the term of this patent is extended or adjusted under 35 U.S.C. 154(b) by 533 days.

(21) Appl. No.: 11/371,575

(22) Filed: Mar. 9, 2006

(65) Prior Publication Data
US 2007/0134552 A1 Jun. 14, 2007

Related U.S. Application Data

(60) Provisional application No. 60/660,761, filed on Mar. 11, 2005.

(51) Int. Cl.
*H01M 4/52* (2006.01)
(52) U.S. Cl. .................. 429/221; 429/2; 429/122
(58) Field of Classification Search ............... 429/221, 429/122, 2
See application file for complete search history.

(56) References Cited

U.S. PATENT DOCUMENTS 4,963,815 A * 10/1990 Hafeman ............... 205/777.5
5,980,787 A * 11/1999 Maly-Schreiber et al. ............... 252/518.1

OTHER PUBLICATIONS

"Redox Reactions of Biomolecule for Nano-bio Battery", Kwang Min Shin et al. Mater. Res. Soc. Symp. Proc. vol. 915 Materials Research Society, 2006.*

* cited by examiner

*Primary Examiner*—Mark Ruthkosky
(74) *Attorney, Agent, or Firm*—George F. Helfrich; Barry V. Gibbens; Kimberly A. Chasteen

(57) ABSTRACT

A thin-film electrode for a bio-nanobattery is produced by consecutively depositing arrays of a ferritin protein on a substrate, employing a spin self-assembly procedure. By this procedure, a first ferritin layer is first formed on the substrate, followed by building a second, oppositely-charged ferritin layer on the top of the first ferritin layer to form a bilayer structure. Oppositely-charged ferritin layers are subsequently deposited on top of each other until a desired number of bilayer structures is produced. An ordered, uniform, stable and robust, thin-film electrode material of enhanced packing density is presented, which provides optimal charge density for the bio-nanobattery.

10 Claims, 3 Drawing Sheets

$$4 M^{2+}_{(aq)} + O_2 \rightarrow 4 M(O)OH + 8 H^+ + 2H_2O$$

MULTILAYER FERRITIN ARRAY FOR BIONANOBATTERY

CROSS-REFERENCE TO RELATED APPLICATION

This Application claims the benefit of U.S. Provisional Application No. 60/660,761, filed on Mar. 11, 2005 for Fabrication of Multilayer Ferritin Array for Bionanobattery.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Cooperative Agreement No. NCC-1-02043 awarded by the National Aeronautics and Space Administration and Science and Technology Corporation Contract Nos. L-71407D and 71200D.

BACKGROUND OF THE INVENTION

1. Field of the Invention

This invention relates generally to nanoscale energy storage units. It relates particularly to multilayer structures of bioinorganic proteins, especially ferritins, as electrode materials for bio-nanobatteries.

2. Description of Related Art

Miniaturization of electronic devices has been a trend in high technology areas, enhancing the efficiency, reducing the power consumption, and increasing performance, speed and functionality. Since 1954, nanotechnology has been a challenge in science and technology. The development of nano-scale devices has accelerated in recent years. It is deemed that progress in the development of nano-scale devices necessitates micro- or nano-scaled power sources. Although nano-scaled devices are near reality, the development of micro- or nano-scale energy storage technology has not been effectively considered and developed for the benefit of nano-scaled devices. The exploitation of these nano-devices will depend on the development of a suitable power supply. Currently, the power systems for many nano-scaled or even micro-scaled devices are many times larger in size than the functional devices. Nano-scaled energy storage systems are critically needed for nano-devices where a large power supply eliminates the benefits accrued by miniaturizing device size, or where a large power supply makes its application impractical.

The bio-nanobattery concept is based on a nano-scaled power storage element which is made out of bioinorganic proteins, making it suitable for use with autonomous nano-scaled devices. This bio-nanobattery has a number of advantages, including nano-scaled system sizes, flexible array structures, distributed power storage, thin-film fabrication, and potential integration with energy harvesting units.

The capacity of a ferritin-based bio-nanobattery is determined mainly by two factors: the redox potential difference between two electrodes and the number of ferritins per unit area of electrode. The potential difference depends on a selected pair of ferritin electrodes. When electrochemical stability is considered for $Fe(OH)_2/Fe(OH)_3 \| Co(OH)_3/Co(OH)_2$ for example, thermodynamic calculation estimates a battery cell potential of 0.66 V from equilibrium potentials of Fe and Co. Other materials carrying a larger reduction potential can produce higher current. If cobalt is replaced with nickel, a similar calculation based on thermodynamic equilibrium potential yields 0.97 V from $Fe(OH)_2/Fe(OH)_3 \| Ni(OH)_3/Ni(OH)_2$. The other way to increase the battery capacity is to increase the number of ferritins deposited on a conductive electrode surface such as gold, indium tin oxide (ITO) glass, or doped silicon. Accordingly, multilayered arrays of ferritin proteins should be prepared with a regular and uniform structure to maximize the number density of ferritin in the array structure.

Biological molecules usually form regular nanostructures under certain conditions. Some proteins, for example, enable two- or three-dimensional ordered arrays on a specific substrate. Using such self-assembling characteristics of bioinorganic proteins, the nano-scaled energy storage units can be assembled into well-organized arrays of single or multilayers. Historically, ferritin arrays have been produced in ways such as Langmuir-Blodgett deposition at air/water interfaces, mechanical scratching method, protein crystallization techniques, and physical adsorption, among others.

However, these methods have been found wanting, because they do not provide thin films which are highly ordered uniform, stable and robust, in short periods of time.

BRIEF SUMMARY OF THE INVENTION

It is a primary object of the present invention to provide what is not available in the art, viz., a highly ordered, uniform, thin-film electrode material for a bio-nanobattery, which is stable and robust, which has an enhanced packing density, thereby providing an optimal charge density, and which may be simply and efficaciously produced in a very short period of time. This primary object and its attending benefits are achieved by providing a thin-film electrode for a bio-nanobattery which is produced as follows:

1. Employing a spin self-assembly procedure, alternately depositing a plurality of oppositely-charged ferritin layers on a substrate by first forming a first ferritin layer on the substrate.
2. Building a second, oppositely-charged ferritin layer on the top of the first ferritin layer to form a bilayer structure.
3. Continuing to deposit oppositely-charged ferritin layers on top of each other until a desired number of bilayer structures is produced.

It has been found to be advantageous if the first ferritin layer is a cationized ferritin layer, the second, oppositely-charged layer is a native ferritin layer, and the substrate is a negatively-charged substrate, such as a silicon substrate having negatively-charged silanol groups on the surface thereof. Other conductive substrates may be also employed advantageously, such as gold, and indium tin oxide(ITO) glass, among others.

Very good results are obtained in providing the present invention if the native ferritin layer is a native horse spleen ferritin layer, and the cationized ferritin layer is prepared by coupling native horse spleen ferritin with N,N-dimethyl-1,3-propanediamine.

Very beneficial results are achieved if iron storage protein ferritins constituting the first and second oppositely-charged ferritin layers, respectively, have been loaded with a different core material by means of a reconstitution process of site-specific biomineralization within the protein shell. These different core materials may be cobalt, manganese, nickel, zinc, and vanadium, among others, each having a different redox capability.

The thin-film electrode material for a bio-nanobattery according to the present invention is very advantageously produced by a process which includes:

1. Depositing cationized ferritin solution on a negatively-charged substrate and spin coating at about 3000-5000 rpm, esp. about 4000 rpm, for about 15 to 45 seconds, esp. about 30 seconds, to produce a first ferritin layer on the substrate.
2. Washing the first ferritin layer with deionized water to remove extra cationized ferritins bound on the first ferritin layer.
3. Depositing native ferritin solution on top of the first ferritin layer and spin coating at about 3000-5000 rpm, esp. about 4000 rpm, for about 15 to 45 seconds, esp. about 30 seconds, to produce a second ferritin layer on top of the first ferritin layer.
4. Washing the second ferritin layer with deionized water to remove extra native ferritins bound on the second ferritin layer.
5. Continuing to deposit oppositely-charged ferritin layers on top of each other until a desired number of bilayer structures is produced.

Thin-film electrode materials according to the present invention, when placed in association with appropriate electrolytes which are well-known in the art, embody effective bio-nanobatteries.

BRIEF DESCRIPTION OF THE SEVERAL VIEWS OF THE DRAWINGS

For a more complete understanding of the present invention, including its primary object and attending benefits, reference should be made to the Detailed Description of the Invention, which is set forth below. This Detailed Description should be read in the light of the accompanying Drawings, wherein.

DETAILED DESCRIPTION OF THE INVENTION

Figure 1:
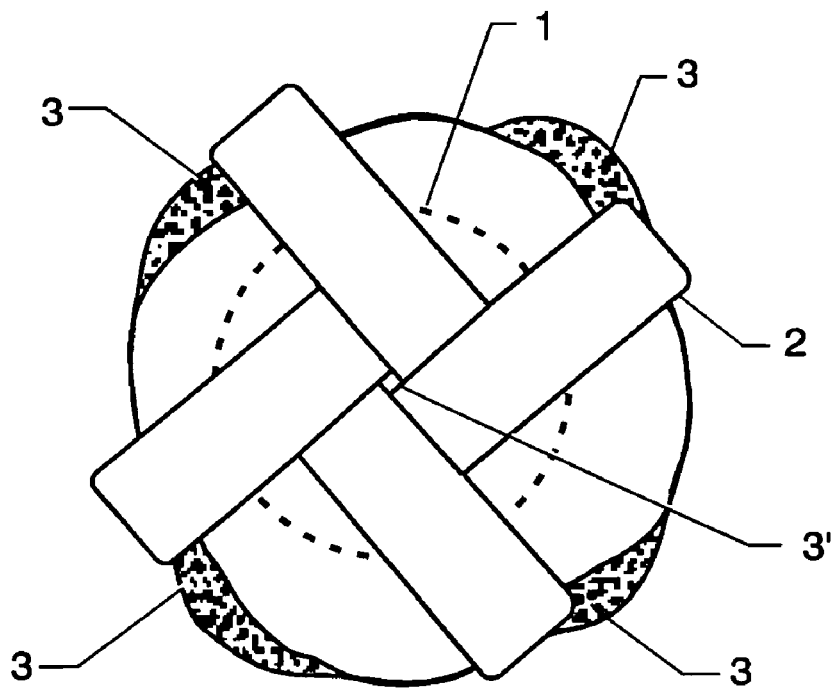
FIG. 1 is a schematic representing the spherical shell of a ferritin protein.

In this invention, ferritins are used for the unit cell of a bio-nanobattery. Referring now to FIG. 1 of the Drawings, ferritin is an iron storage protein found widely in biological systems of humans, animals, and even bacteria. The hollow inner core 1 of ferritin can contain up to ~4500 $Fe^{3+}$ atoms, the complex inorganic form of $Fe(OH)_3$. The ferritin molecule consists of a segmented protein shell with an outer diameter of 12.5 nm and an inner diameter of 7.5 nm. The protein shell consists of 24 protein subunits 2 that form a spherical exterior with channels 3 and 3' through which molecules can enter and leave the protein. When the protein shell is empty and contains no iron, it is called apoferritin. The whole horse spleen ferritin has a molecular weight of 430,000 Da.

Figure 2:
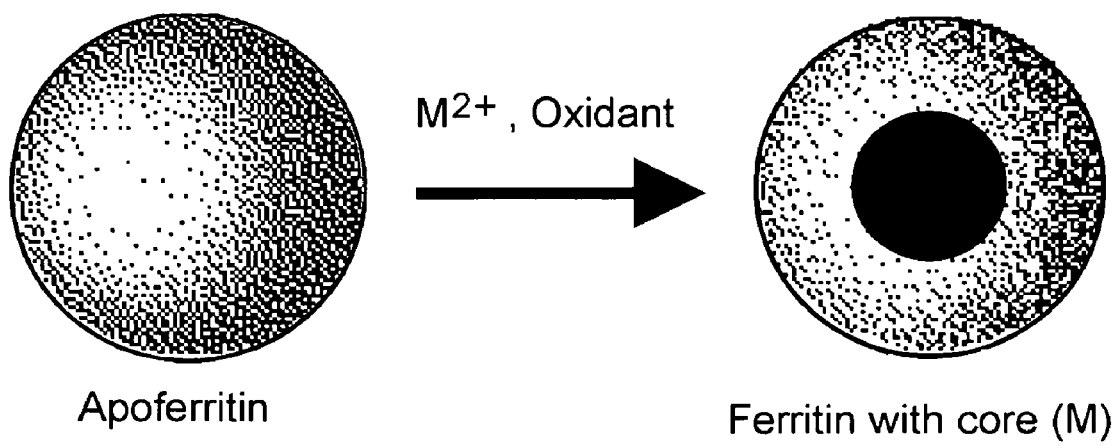
FIG. 2 is a schematic showing a biomineralization process for ferritin proteins, wherein an apoferritin is loaded with an inorganic core material.

By the reconstitution process of site-specific biomineralization within the protein shell, ferritins are loaded with different core materials, each with a different redox capability: cobalt, manganese, nickel, and the like. See FIG. 2

Figure 3:
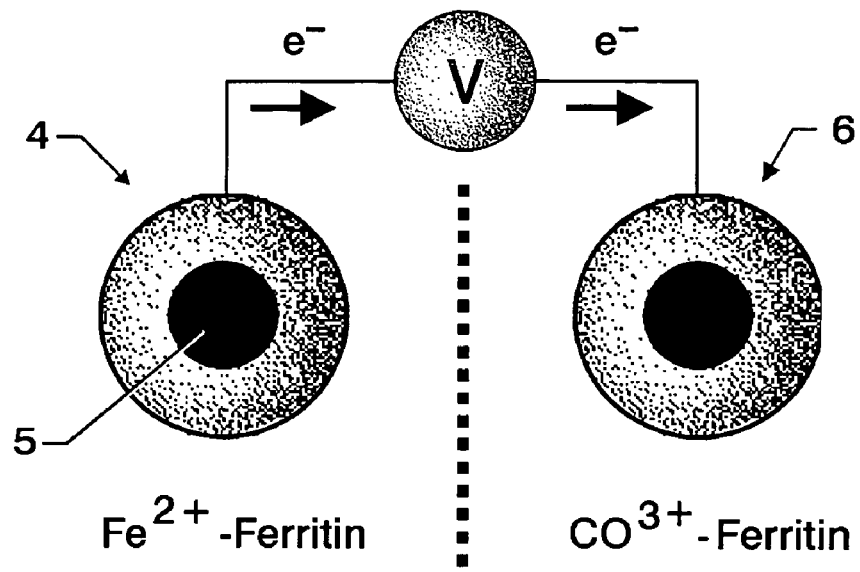
FIG. 3 is a schematic showing the bio-nanobattery concept.

Referring to FIG. 3, the assembled structure 4 of ferritin is remarkably stable and robust, able to withstand biological extremes of high temperature (up to 80° C.) and pH variations (2.0-10.0). In the absence of chelators at pH=7.0, the ferrihydrite core of animal ferritins undergoes reversible reduction to produce a stable $Fe(OH)_2$ core, while all 4500 iron atoms remain within the ferritin interior. When two ferritins with different potentials are paired and connected, the redox reactions involve the transfer of an electron from a donor to an acceptor, as shown in FIG. 3. In this case, native holo-ferritin is loaded with reduced iron (II) core 5 as the electron donor or anode in a battery cell, where cobalt-ferritin 6 plays the role of electron acceptor or the cathode. Electric current flows from iron-ferritin 4 to cobalt-ferritin 6.

Figure 4:
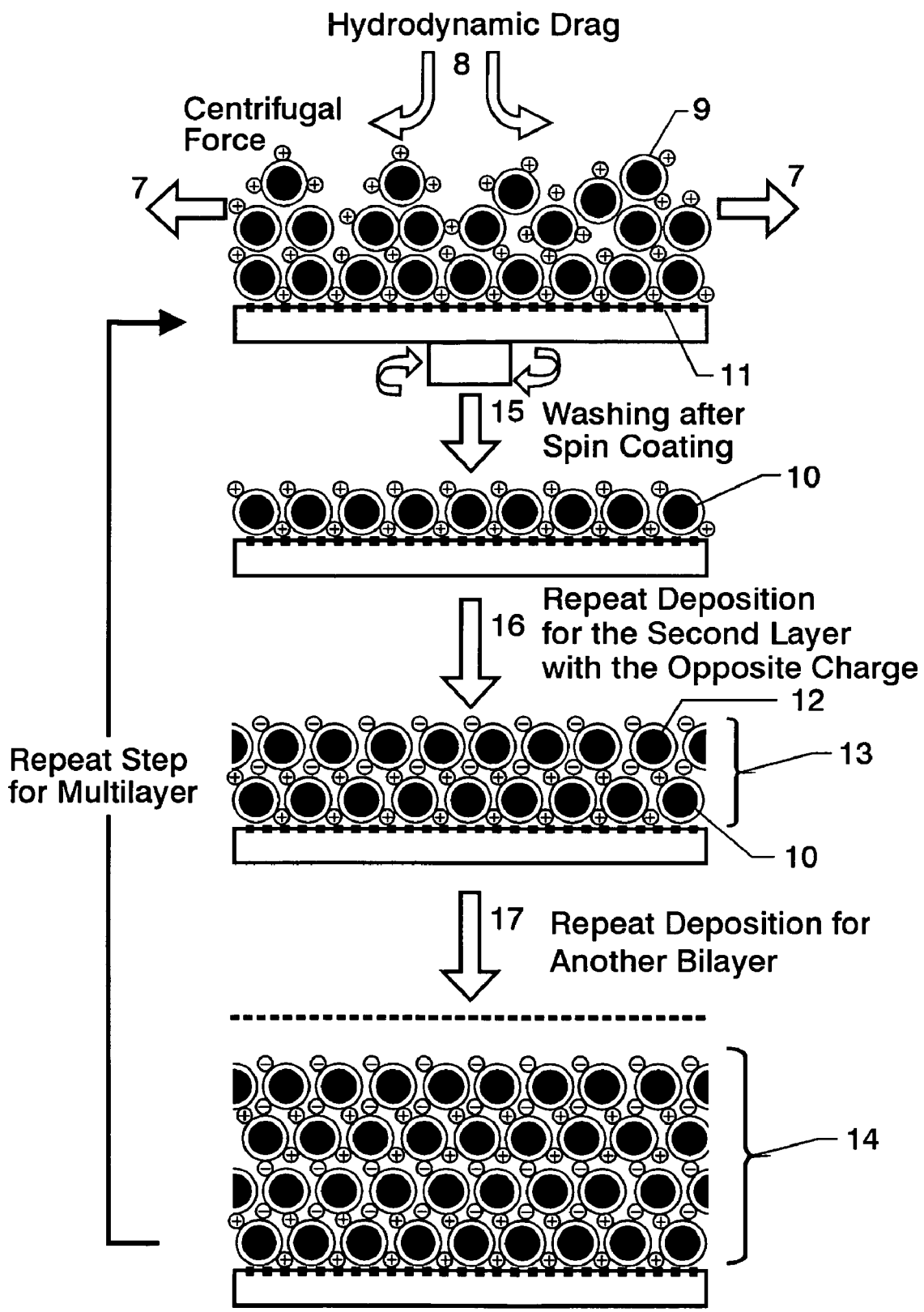
FIG. 4 is a schematic illustrating the assembly of multilayered arrays of ferritin half cells by consecutive spin self-assembly deposition, according to the present invention.

According to the present invention, a spin self-assembly (SA) method was used for constructing well-organized ferritin arrays in very thin films that are highly ordered, flat, and stable, in a much shorter period of time as compared with other methods such as Langmuir-Blodgett or dipping deposition. Referring to FIG. 4, the spin SA procedure involves an alternating deposition of oppositely charged layers so that the fabrication process is accelerated and produces a uniform structure. When the spin SA method is employed for ferritin multilayer fabrication according to the present invention, electrostatic force holds the ferritin particles and strengthens ferritin adsorption on the substrate surface during the spin-coating process. At high spinning speeds, centrifugal force 7 and air drag force 8 acting on the film surface remove loosely-attached ferritin particles 9. Once the first layer 10 is formed on a substrate 11, the second layer 12 of a ferritin array with the opposite charge is built on the top of the first layer 10 to form a bilayer structure 13. By repeating this process, a uniform multilayer 14 of ferritins is created. Spin SA procedures are generally known in the art. See T. Cho et al., Adv. Mater. 2001, 13, No. 14.

EXAMPLE

Native horse spleen ferritin (HoSF) in 0.15 M sodium chloride and cationized ferritin in 0.15 M sodium chloride were used without further purification. Ferritin solution (77 mg/ml) was diluted with 0.15 M sodium chloride to 10 mg/ml, pH=6.1. Cationized ferritin (10 mg/ml, pH=6.1) was used without dilution. 4-Morpholinepropanesulfonic acid (MOPS) was used to prepare buffer solutions (0.01-0.1 M) for pH control of ferritin solution. The water used in all experiments was obtained from a three-stage deionized (DI) water generation system with a resistivity higher than 18 M ohm-cm. Silicon (Si) wafer (n-type) with crystal orientation <100> was cut to a small size (1 cm×1 cm) as a protein layer substrate.

To remove any organic impurities, a Si wafer substrate was first cleaned with piranha solution (4:1 $H_2O_2/H_2O$) at 80° C. for 10 min, followed by rinsing with copious amounts of DI water. Typically, the surface of Si wafer in contact with water/air is covered with abundant silanol groups with negative charge. Further surface cleaning was carried out with a base mixture ($NH_4OH:H_2O_2:H_2O=1:1:5$) to make the substrate surface fully charged.

The spin self-assembly (SA) deposition was conducted by depositing one drop of ferritin solution (10 mg/ml, pH=6.1) on the negatively-charged Si substrate and spin-coating at 4000 rpm for 30 sec. Subsequent washing steps 15 using DI water removed extra ferritins bound on the ferritin layer. Refer again to FIG. 4. The second layer was prepared the same way, by depositing a ferritin layer with the opposite charge on the first one, followed by washing steps 16. A bilayer of ferritins 13 with different charges was formed in two-step spin SA. This alternating deposition process was repeated 17 until the desired number of bilayers was achieved.

The structural characterization and the layer thickness measurement were performed using high-resolution field-emission scanning electron microscopy [FESEM] (Hitachi, S-5200), atomic force microscopy [AFM] (Quesant, Q-Scope 250), and variable angle spectroscopic ellipsometry [VASE] (J. A. Woollam Co., V-VASE). FESEM was employed for investigation of ferritin proteins on Si substrate. All FESEM images were obtained without metal coating on the surface of protein samples. This technique eliminated any possible artifacts attributable to the coating layer. The AFM was used to image the ferritin arrays on the Si substrate. Since protein is soft and vulnerable to mechanical damage, the tapping mode was selected and operated carefully for all AFM images in this work. Silicon probe cantilevers (force constant=1.2-5.5, tip radius of curvature <50 nm) were used for the tapping experiments and modulated sinusoidally at frequencies between 60-90 kHz. The thickness of ferritin layers was measured in air by the use of the spectroscopic ellipsometer equipped with WVASE32 software. We used an incident light at three different angles to the surface normal in the range between 65° and 75° at different wavelengths (280-1000 nm) with a spot diameter of ca. 5 mm. The thickness of native oxide on silicon wafer was measured by ellipsometer and used for an ellipsometric model "ambient/ferritin layers/native oxide/silicon" to determine ferritin layer thickness. Optical constants for ferritin layers were parameterized using the Cauchy model to fit the ellipsometric data with two important assumptions: (1) ferritin layers are isotropic and (2) native and cationized ferritins are optically identical in terms of ellipsometric data.

Figure 5:
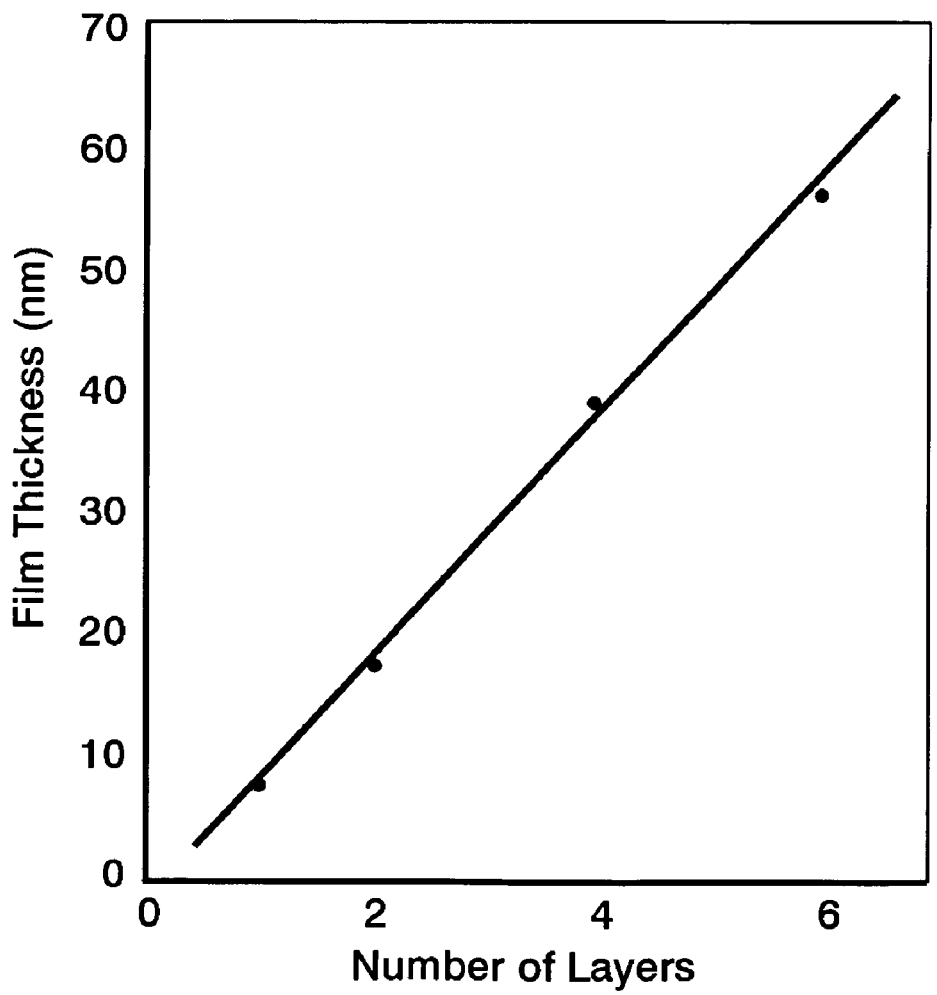
FIG. 5 is a graph showing the linear increase of layer thickness as a function of the number of ferritin layers deposited on a substrate according to the present invention.

FIG. 5 is a graph showing the thickness increase of ferritin multilayers after repeating alternate coatings of cationized and native ferritins using the spin SA method. The result clearly shows a linear increase up to a 6-layer (3 bi-layer) structure. The ferritin arrays were uniformly fabricated with a linear increase in total thickness.

Cationized ferritin prepared by coupling native ferritin (HoSF) with N,N-dimethyl-1,3-propanediamine (DMPA) was used for ferritin deposition in the present invention. This polycationic derivative of ferritin has positive charges on the protein surface, enabling a strong electrostatic attraction to Si substrate that has a negative charge on the surface. Since native ferritins have an isoelectric point (pI) of 4.6, their net charge becomes negative at the intermediate pH. On the other hand, the DPMA coupling modification allows covalent blocking of the free carboxyl groups on the ferritin and additional positive charges resulting from the unattached end of DPMA molecule.

A typical AFM image of a cationized ferritin layer on Si substrate reveals that the ferritin molecules apparently form a single layer on Si substrate. Several large clusters seen as bright spots are also present; these may be three dimensional aggregates of ferritins or foreign materials. Single ferritin has a spherical shape with diameters ranging between 20-50 nm. Considering the known ferritin diameter of 12.5 nm, such large diameter of ferritin is due mainly to the tip-broadening artifact of the AFM tip having finite radius of curvature. On the other hand, high resolution FESEM images show more reasonable images of cationized ferritin layers on Si. Cationized ferritin molecules with diameters of ~10 nm are indicated in FESEM images. The size of ferritin is close to the known dimension of ferritin observed in electron microscopy.

The centrifugal and air drag forces during a short spin SA process successfully deposited cationized ferritins with high surface coverage and good surface uniformity. The VASE measurement also indicated very reasonable thickness of ferritin layers. According to the ellipsometric data, a cationized ferritin layer of thickness 8.4 nm was formed on top of native oxide ($SiO_2$) of thickness 1.9 nm.

One possible reason for a smaller thickness than the known diameter of a single ferritin, 12.5 nm (or 10.0 to 10.5 nm in the electron microscope), was that centrifugal and air drag flow flattened ferritins with ~30% height reduction. In fact, the layer thickness given by the ellipsometric analysis was an averaged value in 5-mm spot. The defects in array structure could be another reason for the discrepancy in thickness measurement. Nevertheless, the ellipsometric characterization of the protein layer is highly reproducible and reliable without typical errors that occur in thickness determination using SEM and AFM, such as, the size change of SEM samples due to the charge level or vacuum condition, as well as indistinct step-height of soft samples during AFM scanning.

Tapping-mode AFM shows the surface of a ferritin bilayer to be very flat, fully packed with ferritin proteins, mostly native ferritins. The surface of three dimensional array of cationized/native ferritin shows that most of the gaps within the initial layer of ferritins were filled through the second layer process. Ferritins observed by AFM were also oversized due to the artifacts of AFM imaging. The equivalent FESEM images, however, shows that the AFM imaging was qualitatively correct. In a nanometer scale view, there still existed three dimensional clusters of ferritins on the surface but Si substrate surface was not revealed through a bilayer structure after repeated spin SA deposition. As indirect evidence of improved surface uniformity, the bilayered sample allowed fitting process of ellipsometric data to be completed with a smaller value of mean square error (MSE). In this case, native oxide of silicon substrate was measured to be 1.9 nm, and a bilayer of cationized and native ferritins was measured to be 19.0 nm. If the first cationized ferritin layer was estimated to have the thickness of 8.4 nm, the top second layer of native ferritins has the thickness of 10.6 nm.

To determine the electrostatic effect between Si substrate and a ferritin layer, the bilayer structure was reversed. The new bilayered structure was prepared by depositing native ferritin first, then a cationized ferritin layer. The repeated spin SA deposition yielded an AFM image which showed that the difference between these two surface structures is that the native ferritins, unlike the cationized ferritins, are not strongly anchored on the substrate surface. According to the ellipsometric data, the layer thickness of the reversed order was 15.8 nm. The MSE value from model fitting also increased. Accordingly, the electrostatic interaction gives a favorable result for a uniform bilayer structure. The cationized ferritins that interact with the electrostatic field of substrate are attached more strongly to the surface than the native ferritins. It is therefore desirable to have a proper ordering sequence for a uniform layer formation.

After alternate coatings of cationized and native ferritins by the spin SA method, it is noticeable that the ferritin arrays were uniformly fabricated with a linear increase of total thickness. If each layer has an identical layer thickness, the average thickness of each layer will be 8.8 nm, very close to the thickness of a single layer of cationized ferritin, 8.4 nm. If we consider packing of ferritins and assume three-dimensional structure of ferritin arrays as face centered cubic (fcc) packing of identical spheres with a diameter, d, the array thickness, h, after deposition of n ferritin layers can be given by $$h = d + \frac{\sqrt{3}}{2}d(n-1), \ (n=1,2,3,\Lambda) \quad (1)$$

The packing efficiency of the multilayer structure produced by the successive spin SA depositions was smaller than one predicted in a perfect fcc structure. High packing efficiency increases the number of ferritins in a unit volume of electrode material of the bio-nanobattery, allowing an increase in total battery capacity of the ferritin bio-nanobattery.

By this invention we have demonstrated the fabrication of multilayered ferritin arrays for bio-nanobattery electrodes using the spin SA method. The spin SA deposition successfully produced well-organized, uniform, and flat structures of ferritin arrays within a very short time frame, which is much faster and simpler than other methods. The successive deposition of ferritin layers with the opposite charges was exploited to organize and strengthen three-dimensional ferritin arrays. The structural characterization of protein layers was performed in a non-destructive way, using FESEM, AFM, and VASE. The ellipsometric analysis allowed a precise and easy determination of protein layer thickness, thus showing a linear increase of the layer thickness of ferritin arrays with the repeated spin SA processes.

In addition to impacting the development of power storage device based on bio-inorganic proteins, the instant results related to protein-based biotemplation and protein array fabrication by the self-assembly process are essential in future applications, such as ultra-high density data storage, quantum electronic devices, nanoelectromagnetics, biochips, biomedical applications, and nanoelectromechanical systems, among many others.

We claim:

1. A thin-film electrode material for a bio-nanobattery, which is produced by a process comprising:
    consecutively depositing arrays of an iron storage protein ferritin on a substrate, employing a spin self-assembly procedure which comprises alternately depositing a plurality of oppositely-charged ferritin layers on the substrate by first forming a first ferritin layer on the substrate, followed by building a second, oppositely-charged ferritin layer on the top of the first ferritin layer to form a bilayer structure, and
    continuing to deposit oppositely-charged ferritin layers on top of each other until a desired number of bilayer structures is produced,
    so that an ordered, uniform, stable and robust electrode material of enhanced packing density is presented, which provides optimal charge density for the bio-nanobattery.

2. The thin-film electrode material of claim 1, wherein the first ferritin layer is a cationized ferritin layer, the second, oppositely-charged layer is a native ferritin layer, and the substrate is a negatively-charged substrate.

3. The thin-film electrode material of claim 2, wherein the negatively-charged substrate is a conductive substrate having negatively-charged functional groups on the surface thereof.

4. The thin-film electrode material of claim 2, wherein the native ferritin layer is a native horse spleen ferritin layer, and the cationized ferritin layer is prepared by coupling native horse spleen ferritin with N,N-dimethyl-1,3-propane-diamine.

5. The thin-film electrode material of claim 4, wherein the spin self-assembly procedure comprises:
    depositing cationized ferritin solution on the negatively-charged substrate and spin-coating at about 3000-5000 rpm for about 15 to 45 seconds to produce a first ferritin layer on the substrate;
    washing the first ferritin layer with deionized water to remove extra cationized ferritins bound on the first ferritin layer;
    depositing native ferritin solution on top of the first ferritin layer and spin coating at about 2000-5000 rpm for about 15 to 45 second to produce a second ferritin layer on top of the first ferritin layer;
    washing the second ferritin layer with deionized water to remove extra native ferritins bound on the second ferritin layer, thereby forming a bilayer structure; and
    continuing to deposit oppositely-charged ferritin layers on top of each other until a desired number of bilayer structures is produced.

6. The thin-film electrode material of claim 5, wherein spin coating is conducted at about 4000 rpm for about 30 seconds.

7. The thin-film electrode material of claim 1, wherein the iron storage protein ferritins constituting the first and second oppositely-charged ferritin layers, respectively, have been loaded with a different core material by means of a reconstitution process of site-specific biomineralization within the protein shell.

8. The thin-film electrode material of claim 7, wherein the different core material is selected from the group consisting of cobalt, manganese, and nickel, each having a different redox capability.

9. A bio-nanobattery comprising a thin-film electrode material according to claim 5 in association with an electrolyte.

10. A bio-nanobattery comprising a thin-film electrode material according to claim 8 in association with an electrolyte.

* * * * *